Sept. 19, 1967  
J. J. SMITH  
3,342,088  
SERVICE FITTING FOR CONNECTING MAINS AND SERVICE LINES OR THE LIKE  
Filed Dec. 10, 1964  
2 Sheets-Sheet 1
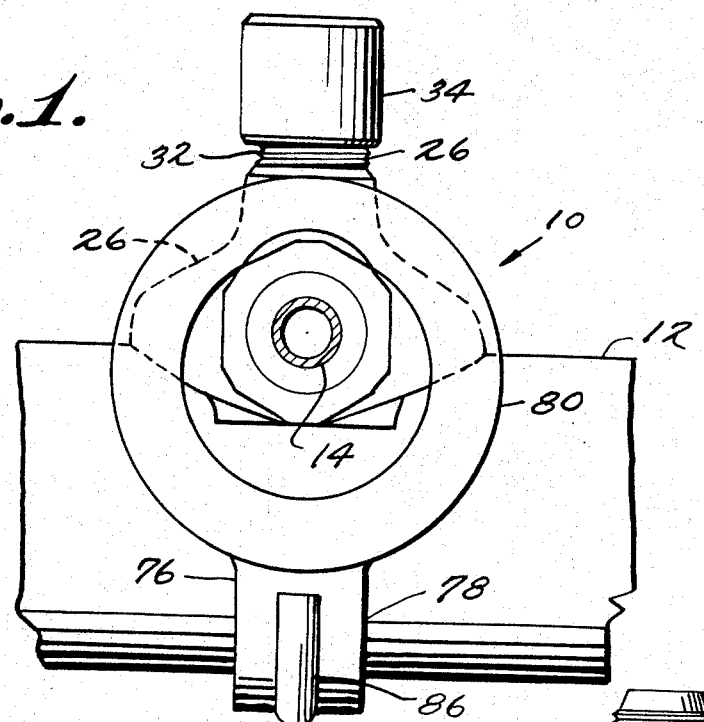
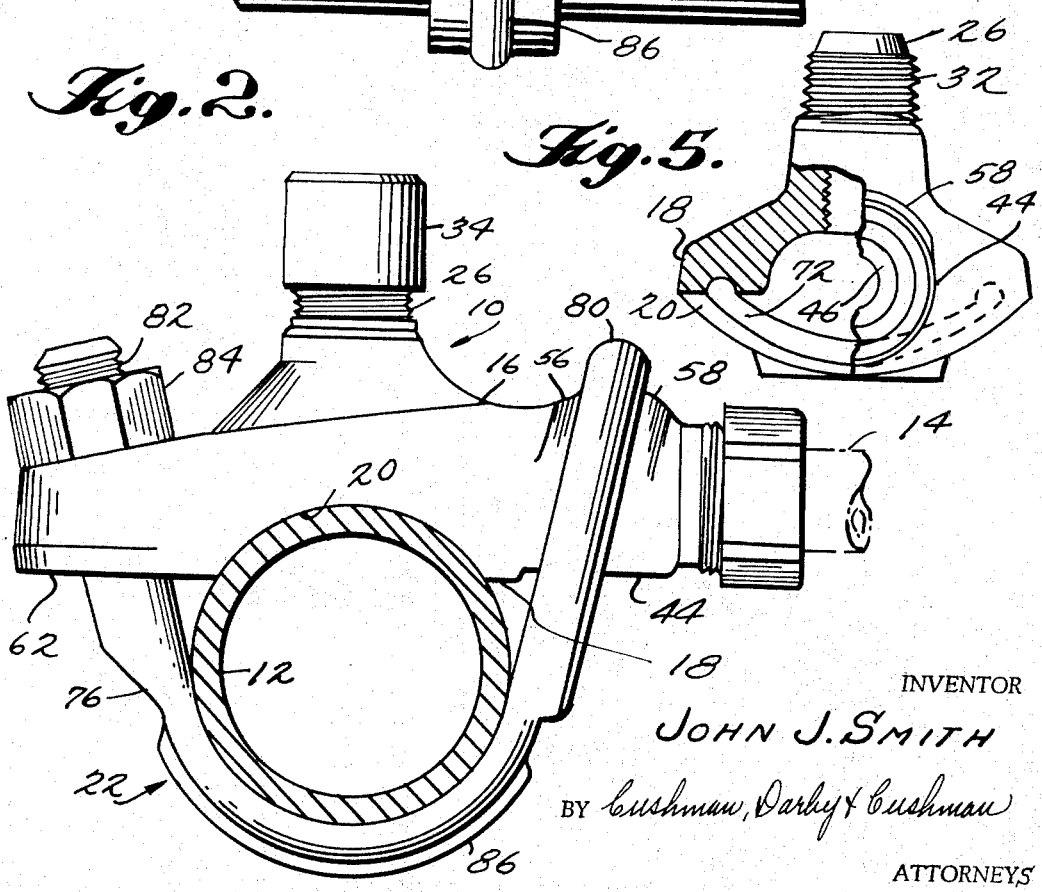
INVENTOR  
JOHN J. SMITH  
BY Cushman, Darby & Cushman  
ATTORNEYS

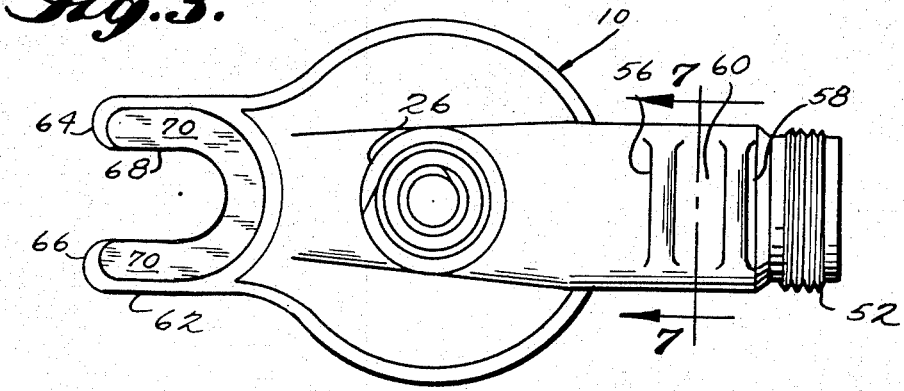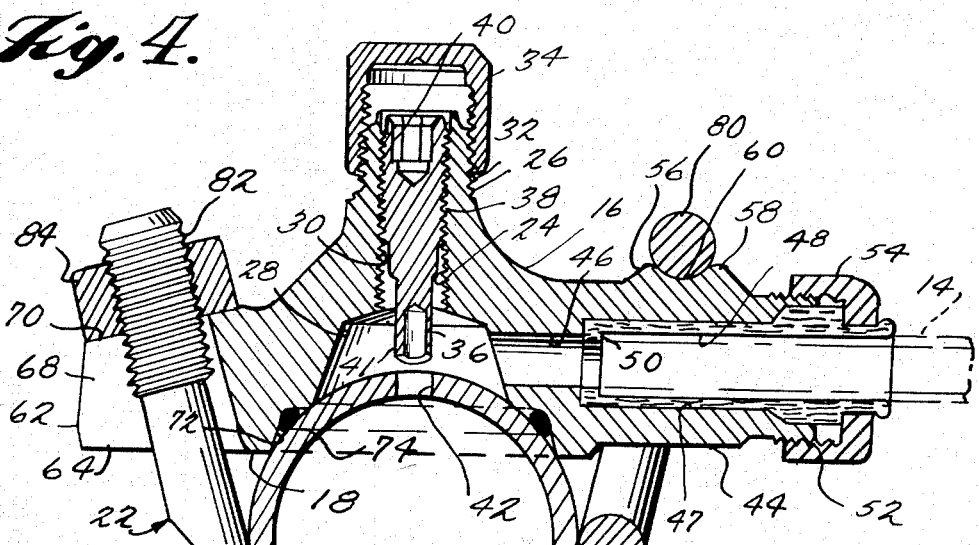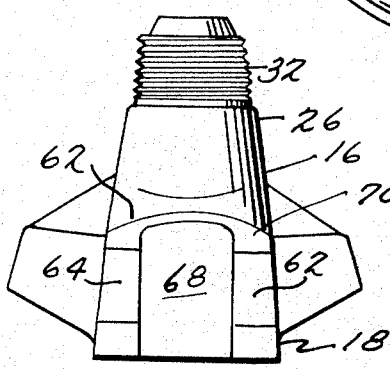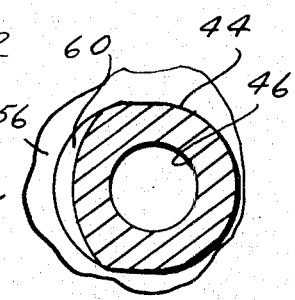

United States Patent Office 3,342,088
Patented Sept. 19, 1967

3,342,088
SERVICE FITTING FOR CONNECTING MAINS AND SERVICE LINES OR THE LIKE
John J. Smith, Decatur, Ill., assignor to Mueller Co., Decatur, Ill., a corporation of Illinois
Filed Dec. 10, 1964, Ser. No. 417,436
14 Claims. (Cl. 77—37)

The present invention relates to a service fitting and, more particularly, to an improved type of service fitting for attaching a service line to an existing main carrying fluid under pressure.

Mains which may be either metal or plastic are now utilized for distributing fluids under pressure, such as water or gas. Usually it is inconvenient to evacuate the mains of the fluid under pressure when it is desired to attach a service line to the same and, therefore, it is desirable that a fitting be utilized which is capable of making the connection between the service line or pipe and the main while the main has fluid under pressure therein and without the escape of fluid to atmosphere. This is particularly important and desirable when the main carries gas as the escape of gas would create a hazardous condition during the connection of the service line to the main.

While the fitting for the present invention will be described in connection with its use in attaching a service line to a main, the main having fluid under pressure therein, it will, of course, be understood that the service fitting of the present invention has utility in connecting a service line to a main not under pressure, the main being provided with an opening therein prior to the application of the service fitting. The terms "main" and "service line" as used throughout the specification and claims are to be broadly construed in a sense of connecting one pipeline to another pipeline regardless of whether the pipelines are made of metal, plastic, or other materials.

An object of the present invention is to provide an improved service fitting for connecting a main to a service line, the service fitting being quickly and easily attached to or remove from the main by the tightening or loosening of a single nut.

Another object of the present invention is to provide an improved service fitting for use in connecting service lines to mains, the service fitting being economical and simple to manufacture and easy to install with standard tools.

A further object of the present invention is to provide an improved type service fitting including basically three parts for attachment to a main, a first integral part or body member having a saddle part, a second part or clamping strap and a third part or nut for cooperation with the body part and the clamping strap.

Still another important object of the present invention is to provide an improved service fitting in which the outlet branch of the same is utilized by a clamping means to retain the fitting on the main, thus resulting in the service fitting having a shorter overall height than service fittings heretofore made thereby reducing the chances of the service fitting being knocked off of the main after installation and prior to or during completion of the project.

Ancillary to the immediate preceding object it is still another object of the present invention to provide a service fitting which is compact when assembled on the main and which is sturdy yet quite small in overall size.

These and other objects and advantages of the present invention will become more apparent from the following detailed description in the specification, the claims, and the accompanying drawings in which:

FIGURE 1 is a side elevational view of a main with the service fitting of the present invention installed thereon, the view looking into the end of the service fitting having the outlet branch extending therefrom;

FIGURE 2 is a side elevational view of the service fitting of the present invention installed on a main, the main being illustrated in cross section;

FIGURE 3 is a top plan view of the service fitting of the present invention with the cover cap removed as well as the follower nut used in connecting the service line to the main in fluid tight connection being removed;

FIGURE 4 is a side vertical sectional view of the service fitting of the present invention installed on a main, the view being similar to the elevational view of FIGURE 2;

FIGURE 5 is an end elevational view of the body member of the service fitting, the view being partly broken away to disclose the interior of the same;

FIGURE 6 is an end elevational view of the body member of the service fitting of the present invention looking from the opposite end to that illustrated in FIGURE 5; and FIGURE 7 is a sectional view taken substantially on the line 7—7 of FIGURE 3.

Referring to the drawings wherein like character and reference numerals represent like and similar parts, the service fitting of the present invention is generally designated at 10 and connects a main 12 to a service line 14 extending to a point of use such as a dwelling or the like. The main 12 may be a metal or plastic main and is adapted to carry fluid under pressure such as gas or water. The service line 14 which extends to a dwelling or other point of use is usually copper but may be made of other metals or plastic materials.

Service fitting 10 has a unitary body member 16 made as a malleable iron casting or as a steel forging, the body member 16 being provided with an integral saddle part 18 having an arcuate surface 20 generally of a curvature complementary to the curvature of a portion of the external surface of main 12. Clamping means generally designated at 22 form part of the service fitting 10 and clamp the body member 16 in fluid tight connection to the main 12.

The body member 16, as best shown in FIGURE 4, is provided with a throughbore 24 opening centrally of the arcuate surface 20 of the saddle part 18 at its inner end and extending therefrom outwardly through a boss 26 integrally provided on the body member. The bore 24 is provided with an enlarged shallow well portion 28 where it opens to the arcuate surface 20, the remaining portion of the bore 24 being threaded with interior threads as indicated at 30. The boss 26 surrounding the outermost portion of the bore 24 s provided with exterior threads as indicated at 32 and is adapted to threadably receive a cover cap 34.

A cutter member 36 having exterior threads 38 along at least a portion of its periphery is threadably received in the bore 24 and is provided with an Allen socket 40 in its upper end and a cutter or bit 41 at its lower end. The cutter member 36 may be advanced and retracted longitudinally of the bore 24 by inserting an Allen wrench into the Allen socket 40, the cutter member 36 being used to cut an opening 42 in the main 12 after the fitting has been installed on the main and after the service pipe 14 has been connected to the fitting 10. The cutter member 36 may be of the type disclosed in Frank H. Mueller's U.S. Patent No. 2,839,075 issued June 17, 1958, or the type disclosed in Frank H. Mueller et al., application Ser. No. 405,427, filed Oct. 21, 1964, now Patent No. 3,264,-907. It will be appreciated that cutters members other than the type disclosed in the aforementioned United States patent and pending application may be used with the present invention.

The body member 16 is provided with an outlet branch member 44 integral therewith and extending outwardly therefrom in a direction transverse to the longitudinal axis of the main when the body member is positioned on the main. Branch member 44 has a bore 46 therethrough which opens into the enlarged shallow well portion 28 of bore 24 in the body member 16. The outer portion of the bore 46 of the outlet branch member 44 is enlarged as indicated at 47 so that it may receive an insulating compression coupling sleeve 48 having an inwardly extending flange 50 at its inner end. Exterior threads 52 are provided on the outer end of branch member 44, the threads 52 being adapted to receive a follower or jam nut 54. It will be understood that the service line 14 is stabbed into the compression coupling sleeve 48 against the flange 50 of the same after the fitting 10 has been tightly clamped on the main 12, the follower or jam nut 54 then being tightened to further compress the sleeve 48 and wedge the same securely between the service line 14 and the branch member 44 so as to provide a fluid tight connection.

The upper surface of the branch member 44 as viewed in the drawings is provided with a pair of spaced ribs 56 and 58 which define a groove 60 therebetween. The ribs 56 and 58 extend partway around the outlet branch member 44 in a direction transverse to the longitudinal axis of the outlet branch member and the purpose of such ribs will be described in more detail later in the specification.

While the drawings disclose the outlet branch member 44 extending straight out from the body member 16 when the body member is positioned on the main 12, it will be understood that the outer end portion of the outlet branch member 44 may have a gentle 90° turn therein so that the service line 14 could extend into the outlet branch member parallel to the main 12 at its point of connection. Of course, the turn in the branch outlet member 44 would be outwardly of the ribs 56 and 58 and would be of sufficient length to incorporate the coupling means defined by the sleeve 48 and the follower nut 54.

Body member 16 is provided with a bifurcated lug 62, the lug 62 being integral with the body member and extending outwardly of the same in an oppositely disposed direction to the direction of extension of the outlet branch member 44. The bifurcated lug member 62 is defined by a pair of spaced arms 64 and 66 having an open ended slot 68 therebetween. The upper surface 70 of the arms 64 and 66 is flat or planar as best shown in FIGURES 3 and 6, the flat surface 70 being on a slight angle to a horizontal plane through the body member 16 and branch member 44 when viewed in FIGURES 2 or 4.

The arcuate surface 20 of the saddle part 18 is provided with an annular groove 72 circumscribing the opening of the enlarged shallow well portion 28 of the bore 24. Groove 72 is arranged to receive a gasket 74 cemented therein, the gasket 74 being shown as an O-ring. The O-ring 74 has a diameter slightly greater than the depth of the groove 72 so that when the body member 16 is placed on the main 12, the O-ring contacts the surface of the main and provides a fluid tight seal therewith when it is compressed by the clamping means 22 acting on the body member 16.

The clamping means 22 includes a strap member 76 which is generally U-shaped and has an intermediate portion 78 for contact with a portion of the exterior surface of the main 12. The strap member 76 has an eye bolt 80 at one end and substantially defining one leg thereof, the eye bolt having sufficient diameter to enable it to be slipped over the branch member 44 and seated in the groove 60 defined by the ribs 56 and 58. The other end or leg of the strap member 76 is externally threaded as indicated at 82 and is arranged to extend between two arms 64 and 66 of the bifurcated lug 62 and outwardly of the same as best shown in FIGURES 2 and 4. It will be noted that the lugs of the U-shaped strap member 76 are not parallel but extend outwardly away from each other. A nut 84 threaded onto the threads 82 of the strap member 76 bears against the flat or planar bearing surface 70 of the lug 62 and pulls the body member 16 into fluid tight engagement with the main 12. It will be noted that the intermediate portion 78 of the U-shaped strap member 76 is relatively wide and flat so as to provide a good bearing surface with the exterior surface of the main 12. Also, the intermediate portion 78 is provided with a rib 86 extending about its external side, the rib functioning to stiffen the intermediate portion of the strap 76.

When it is desired to connect the service line 14 to the main 12, the exterior surface of the main is carefully cleaned by a file or other hand tool in the area where fitting 10 is to be applied. Then the body member 16 of the service fitting 10 is positioned on the cleaned portion of the main and the eye bolt of the U-shaped strap member 76 is slipped over the branch member 44 and seated in the groove 60 between the ribs 56 and 58. The strap member 76 is then pivoted about the opposite side of the main 12 so that its threaded end or leg 82 extends upwardly through the opening 68 between the arms 64 and 66 of the bifurcated lug 62, the upper end of the same extending out of the lug. The nut 84 is threaded into the threads of end 82 of the strap member 76 and the body member 16 is drawn down tightly onto the main 12 so that the O-ring 74 is compressed into tight sealing engagement with the main. The next step in making a connection between the service line 14 and the main 12 is to stab the service line 14 into the compressible coupling sleeve 48 and then tightly secure the same by tightening the follower or jam nut 54. After this has been completed, the only steps necessary to completing the service connection is to remove the cap 34 and thread the cutter member 36 downwardly in the bore 24 until it cuts the opening 42 in the main 12. When this has been accomplished, the cutter member 36 is threaded outwardly to the position shown in FIGURE 4 and the cap 34 is replaced on the boss 26.

By providing the particular clamping arrangement illustrated and described wherein the eye bolt 80 slips over the branch member 44 and engages the groove 60, the overall height of the service fitting 10 can be materially reduced resulting in the saving of material and costs while yet providing a sturdy service fitting. Also, by the particular arrangement of clamping, no special tools need be used to connect the fitting to the main as it is merely necessary to screw the nut downwardly onto the strap 76.

It thus will be seen that the objects and advantages of the present invention have been fully and effectively accomplished by the service fitting described above and illustrated in the drawings. Further, it will be realized that various changes may be made in the specific embodiment shown and described without departing from the principles of the present invention.

Therefore, the terminology used throughout the specification is for the purpose of description and encompasses all modifications of the invention within the spirit and scope of the following claims.

What is claimed is:

1. A fitting for connecting a service line to a main comprising a body member having an integral saddle part provided with an arcuate surface for fitting closely about a portion of an exterior surface of a main, the arcuate surface of said saddle part having means thereon for providing a fluid tight seal between said body member and said main, said body member having a bore therein opening to the arcuate surface of the saddle part and arranged to align with an opening provided in said main, an outlet branch member integral with and extending from said body member in a direction transverse of the longitudinal axis of said main when said body member is positioned on said main, said outlet branch member having a bore therethrough communicating at its inner end with the bore in said body member, means carried by said outlet branch member for connecting a service line to said outlet branch member with a fluid tight connection, a lug extending from said body member in a direction oppositely disposed to said outlet branch member, said lug having an open slot therein, and clamping means engaging said lug and said outlet branch member and extending about said main and oppositely disposed to said body member for maintaining said body member on said main, said clamping means including a generally U-shaped strap having an eye bolt portion at one end thereof for fitting over and engaging said outlet branch member, said strap having its other end threaded and extending through the open slot in said lug, and a nut on the threaded end of said strap for bearing against said lug.

2. A fitting as claimed in claim 1 in which the arcuate surface of said saddle part is provided with an annular groove circumscribing and spaced from the opening of the bore of the body member on the arcuate surface and in which said means for providing a fluid tight seal between said body member and said main includes an O-ring cemented in said groove and having a diameter in cross-section slightly greater than the depth of said groove.

3. A fitting as claimed in claim 1 in which said outlet branch member includes means on its outer surface for receiving and positioning the eye bolt portion of said strap.

4. A fitting as claimed in claim 3 in which said last-mentioned means includes a pair of spaced ribs on the exterior surface of said outlet branch member defining a groove about at least a portion of said branch member.

5. A fitting as claimed in claim 3 in which said body member is a malleable iron casting and in which said strap is a steel forging.

6. A fitting as claimed in claim 3 in which said body member is a steel forging and in which said strap is a steel forging.

7. A fitting as claimed in claim 1 in which the bore in said body member opening to the arcuate surface of the saddle part is a through bore threaded along at least a portion thereof, and including a cutter member having external threads thereon and threadably received in the threads of said bore, said cutter member being axially movable in said bore to cut the opening in said main, said body member having a boss surrounding the outer end of the bore therein, said boss being externally threaded, and a cap member threadably received on said boss.

8. A fitting for connecting a service line to a main comprising a body member having an integral saddle part provided with an arcuate surface for fitting closely about a portion of an exterior surface of a main, the arcuate surface of said saddle part having means thereon for providing a fluid tight seal between said body member and said main, said body member having a through bore therein opening at its inner end to the arcuate surface of said saddle part, said bore having an enlarged portion adjacent to its opening on the arcuate surface of said saddle part, the enlarged portion of said bore having a diameter greater than the diameter of an opening in said main, means for closing the outer end of the through bore of said body member, an outlet branch member integral with and extending at least partway from said body member in a direction transverse of the longitudinal axis of said main when said body member is positioned on said main, said outlet branch member having a groove on its outer surface extending transversely of and partway around the same, said outlet branch member further having a bore therethrough communicating at its inner end with the enlarged portion of the bore in said body member, means carried by said outlet branch member for connecting a service line to said outlet branch member with a fluid tight connection, a bifurcated lug integral with and extending from said body member in a direction oppositely disposed to said outlet branch member, a U-shaped strap having an eye bolt portion at one end thereof and the outer end externally threaded, said U-shaped strap being arranged to have its eye bolt portion fit over said outlet branch and engaged in the external groove thereon with its other threaded end extending through and out of said bifurcated lug, and a nut received on said threaded end of said U-shaped strap for bearing against said bifurcated lug.

9. A fitting as claimed in claim 8 in which said U-shaped strap as an intermediate portion between said eye bolt portion and its other threaded end for engaging the main and which is substantially flat, said intermediate portion having an external stiffening rib integrally formed thereon.

10. A fitting as claimed in claim 9 in which said groove on the external surface of said outlet branch member is defined by a pair of spaced ribs extending at least partway around said outlet branch member.

11. A fitting as claimed in claim 8 in which said means for closing the outer end of the through bore in said body member includes a cutting member axially movable in the through bore for cutting the opening in said main.

12. A fitting as claimed in claim 11 further including a boss portion on said body member surrounding the outer end of said through bore, said boss portion being exteriorly threaded, and a cap threadedly received on said boss portion.

13. A fitting as claimed in claim 8 in which said body member is a steel forging and in which said strap member is a steel forging.

14. A fitting as claimed in claim 8 in which said body member is a malleable iron casting and in which said strap member is a steel forging.

References Cited

UNITED STATES PATENTS

| | | | | |
|---|---|---|---|---|
| 2,427,994 | 9/1947 | Merrill | | 77—38 |
| 3,104,456 | 9/1963 | Powell | | 137—318 |
| 3,198,206 | 8/1965 | O'Brien | | 137—318 |
| 3,240,226 | 3/1966 | Burkholder | | 137—318 |

WILLIAM W. DYER, JR., *Primary Examiner.*

GERALD A. DOST, *Assistant Examiner.*